April 28, 1953  H. M. KOONS  2,636,711
FAUCET VALVE ASSEMBLY
Filed Dec. 19, 1950
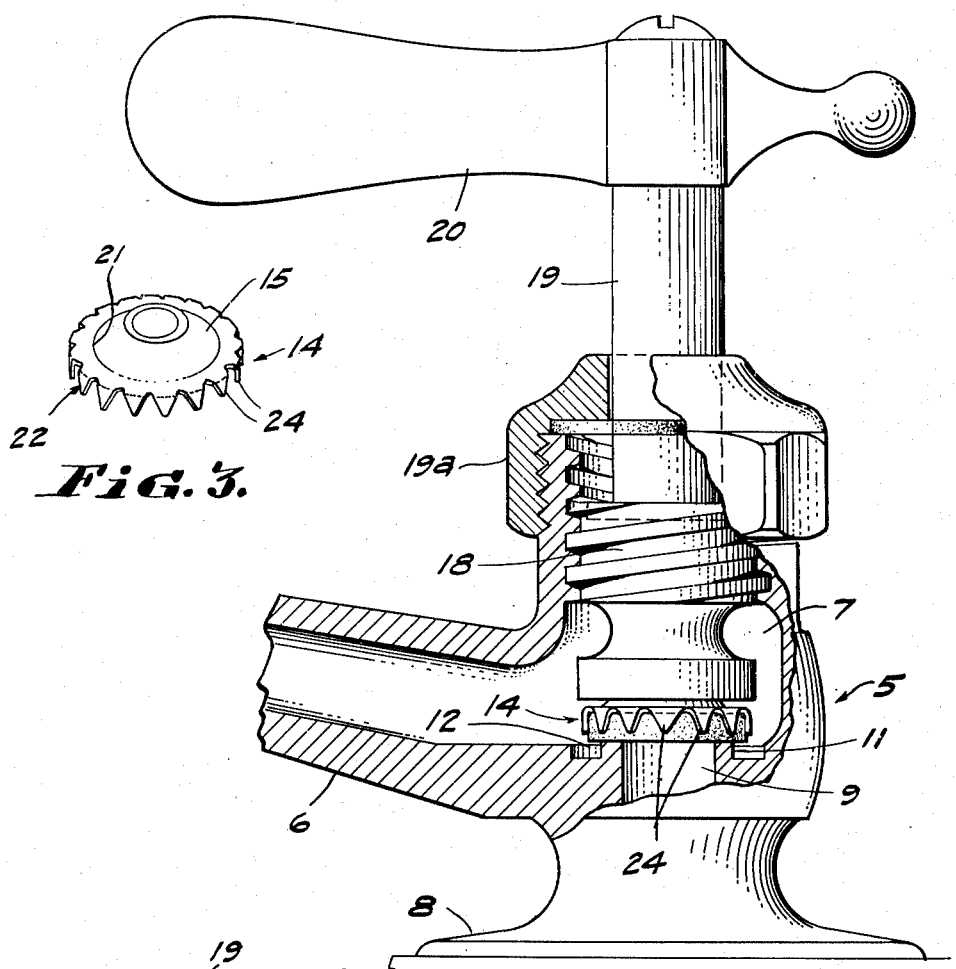
Fig. 3.
Fig. 1.
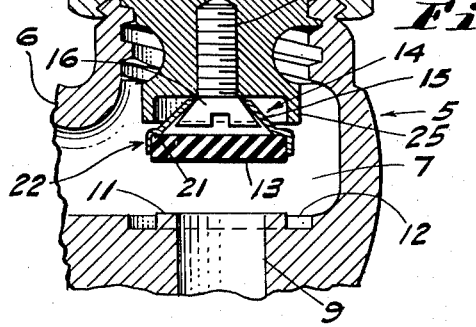
Fig. 2.
HARRY M. KOONS,
INVENTOR.
BY
ATTORNEY Patented Apr. 28, 1953

2,636,711

UNITED STATES PATENT OFFICE 2,636,711

FAUCET VALVE ASSEMBLY

Harry M. Koons, Los Angeles, Calif.

Application December 19, 1950, Serial No. 201,547

2 Claims. (Cl. 251—46)

My invention relates to an improved faucet valve assembly, the improvement residing principally in the differently constructed valve washer retainer and the manner in which it is assembled and supported in relation to the valve stem through the medium of the valve stem screw.

There are, at present, prior art patents of record having to do with solving, in different ways, the problem of maintaining the faucet valve washer on its seat in a non rotative manner while the valve stem is being screwed down in the final operation of closing the valve. I refer particularly to Patents 1,211,595 issued January 9, 1917 and 1,985,149 issued December 18, 1934 wherein these disclosures are made.

However, there are certain defects in the prior art patents which it is an object of the present invention to overcome and these will be more fully hereinafter pointed out along with the disclosure of improved features new in the art.

One of the principal aims of the invention is, in addition to providing the non rotative feature in the final seating of the valve washer, to mount the valve washer retainer in an improved manner as to cause it to slightly wabble if necessary in order to accomplish a more equalized seating of the valve washer on its seat.

A more specific object is to provide a valve washer retainer wherein an advantageous frusto-conical feature is produced in a less expensive and more convenient manner by so bending a sheet metal part as to produce a frusto-conical body adapted to cooperate with the frusto-conical head of a valve screw, the taper of the sheet metal being less steep than that of the screw head so as to allow the sheet metal member to wabble as is necessary to seat properly the valve washer carried thereby, when the valve seat is not truly horizontal.

The invention also relates to a new article of manufacture which is attachable to faucet valves now in use.

Other objects, advantages and features of invention will hereinafter appear.

Referring to the accompanying drawing, which illustrates a preferred, reduced to practice, embodiment of the invention, Fig. 1 is a fragmentary side elevation of the valve to which the device is applied, parts of the valve casing being broken away to disclose in elevation improved interior structure.

Fig. 2 is a fragmentary, vertical midsection of the structure to which the invention pertains.

Fig. 3 is a perspective view of the valve washer retainer per se.

Referring in detail to the drawing, the device is shown applied to a conventional faucet having a casing portion 5 and an outlet spout 6 extending laterally from and communicating with the lower portion of the valve chamber 7. Said faucet is shown having a basal portion 8 through which leads the vertical fluid passage 9, said basal portion being attachable to, for example, a sink structure 10. The upper end of said passage 9 is surrounded by a conventional valve seat 11 shaped as a circular rise surrounded, in turn, by a circular groove 12.

The solid rubber valve washer 13, which cooperates with said valve seat, is carried by a sheet metal valve washer retainer 14 having a frusto-conical body portion 15 surrounding the frusto-conical head 16 of the screw 17, said screw being screwed axially into the lower end portion of the conventional screwthreaded valve stem 18 furnished with the shank 19 and operating handle 20, a conventional screw cap 19a being shown applied to the upper end of the valve casing.

Describing more fully the sheet metal valve washer retainer 14 and its relation to adjacent parts, the frusto-conical body portion 15 of said member is surrounded by a horizontal flange 21 integral with the outer edge of which is a vertical skirt flange 22, said skirt flange being sufficiently long to bring its lower edge down to about the lower face of the conventional valve washer 13 which is gripped within said skirt flange. By preference and as shown, said skirt flange is serrated in such a manner as to provide around its circumference a series of triangular teeth or prongs 24, thus rendering it easier to bend it inwardly into a clamping relation to the washer 13 which it surrounds.

The lower end of the turnable valve stem 19 is shown having around it the conventional, downwardly directed flange 25, and it is to be understood that the valve washer 13 is to be removed from the space within said flange 25 to provide room for supporting the frusto-conical body portion 15 of the valve washer retainer 14 within said space in the manner illustrated in Fig. 2, where a slight clearance is shown between the circularly apertured upper end of said member 14 and the lower end of the body portion of the valve stem 18. Also, in the mounted position of the device, the horizontal portion 21 of the valve washer retainer 14 is spaced slightly below the lower end of the valve stem flange 25. Also between the screw head 16 and the washer 13 is a vertical space at least equal to the space between the flange portions 21 and 25. These spacing features, in conjunction with the fact that the taper of said frusto-conical body portion 15 is less steep than the taper of the screw head 16, allow said member 14 a slight universal rocking movement which automatically fits the screwed down valve washer 13 to the valve seat 11 when there is a misalinement of said valve seat to be compensated for.

Owing to the fact that the circumference of the upper, open end of the frusto-conical part of the member 14 is much less than the circumference of the valve seat 11, during the final part of the screwing down of the valves, relative rotation of the parts will take place along the annular contact of the upper end of said member 14 with the lower end of the valve stem 18, rather than between the valve seat 11 and the part of the washer 13 engaged thereby, thus reducing wear on the washer and minimizing the amount of frictional contact between the sheet metal washer retainer 14 and valve stem 18. Therefore in closing the valve the lower end of the valve stem 18 will engage only the upper, annular edge of said member 14 while said screw head is still out of contact with said washer.

The aforesaid teeth or prongs 24 of the valve washer retainer are not vital to the operativeness of the device, but they facilitate the inbending of the skirt portion 22 so as to grip securely the valve washer 13.

It will be seen that, considered as an article of manufacture the device comprises a sheet metal member having an open-ended frusto-conical body portion which is somewhat greater in axial extent than the head of the faucet valve screw, the opening in the smaller end of said body portion being slightly larger than the diameter of the portion of said screw adjacent to its head, and said sheet metal member being, as already stated, otherwise contoured and dimensioned to provide for the adjustive movement of the washer which it carries in relation to the valve seat.

Although it is thought that the manner of assembling the device will be understood from the foregoing description, a more specific statement thereof is as follows.

When it is desired to convert a conventional faucet valve into a valve structure embodying the invention, the conventional valve washer screw is first removed together with the centrally apertured washer carried thereby, and then, after the sheet metal washer retainer 14 has been applied to the frusto-conically headed screw 17 said screw is screwed fully into the socket from which the conventional screw was removed. Then the imperforate valve washer 13 is fitted within the skirt flange 22 and the prongs of said flange are inbent so as firmly to grip said washer. When said washer becomes worn, some or all of said prongs may be outbent sufficiently to allow the worn washer to be removed and a new one put into its place to be gripped by again inwardly bending said prongs.

The valve washer retainer provided by this invention can be rapidly and economically stamped out of sheet metal and lowers the cost and time required to produce the forged or cast parts for which it forms a valuable substitute.

I claim:

1. A sheet metal washer retainer supported upon the frusto-conical head of a screw screwed axially into a faucet valve stem from which stem the conventional washer has been removed leaving a circular recess in the end of said valve stem centrally occupied by said screw head, said washer retainer comprising a frusto-conical body portion with an open smaller end portion loosely surrounding the head of said screw and normally slightly spaced away from the juncture of the screw head with the stem of the screw, said washer retainer having a peripheral portion gripping peripherally a valve washer, the taper of said frusto-conical head of said screw being steeper than the taper of said frusto-conical body portion, the peripheral portion of said washer retainer being spaced below the intact portion of said valve stem surrounding said recess a greater distance than the space between the smaller end of said frusto-conical body portion and the recessed end of said valve stem.

2. In a faucet valve assembly, the combination, with a frusto-conically headed screw screwed axially into and having the inner side of its head located at the end of the valve stem; of a sheet metal valve washer retainer with a frusto-conically shaped body portion having an apertured smaller end loosely surrounding the head of said screw in a slightly spaced relation outwardly from the inner end of said head when allowed to gravitate to that position, the taper of said body portion being less steep than the taper of the screw head so that said valve washer is wabbly supported by said screw head, the upper end of said frusto-conical body portion contacting with the lower end of the valve stem when the latter is in the valve closing position, and a valve disk to which the larger end of said sheet metal washer retainer is axially secured, there being at all times a clearance between the outer surface of the head of said screw and the adjacent face of said disk, said clearance accommodating said wabbly movement and protecting said disk from injury by said screw head.

HARRY M. KOONS.

References Cited in the file of this patent

UNITED STATES PATENTS

| Number | Name | Date |
|---|---|---|
| 1,485,508 | Kiley | Mar. 4, 1924 |
| 1,939,128 | Meyer | Dec. 12, 1933 |
| 1,953,448 | Thaete | Apr. 3, 1934 |
| 2,192,117 | Wile | Feb. 27, 1940 |
| 2,203,684 | Hare | June 11, 1940 |
| 2,271,391 | Drake | Jan. 27, 1942 |